May 9, 1933.    J. S. PARSONS    1,907,565
NETWORK DISTRIBUTION SYSTEM
Filed Oct. 20, 1930
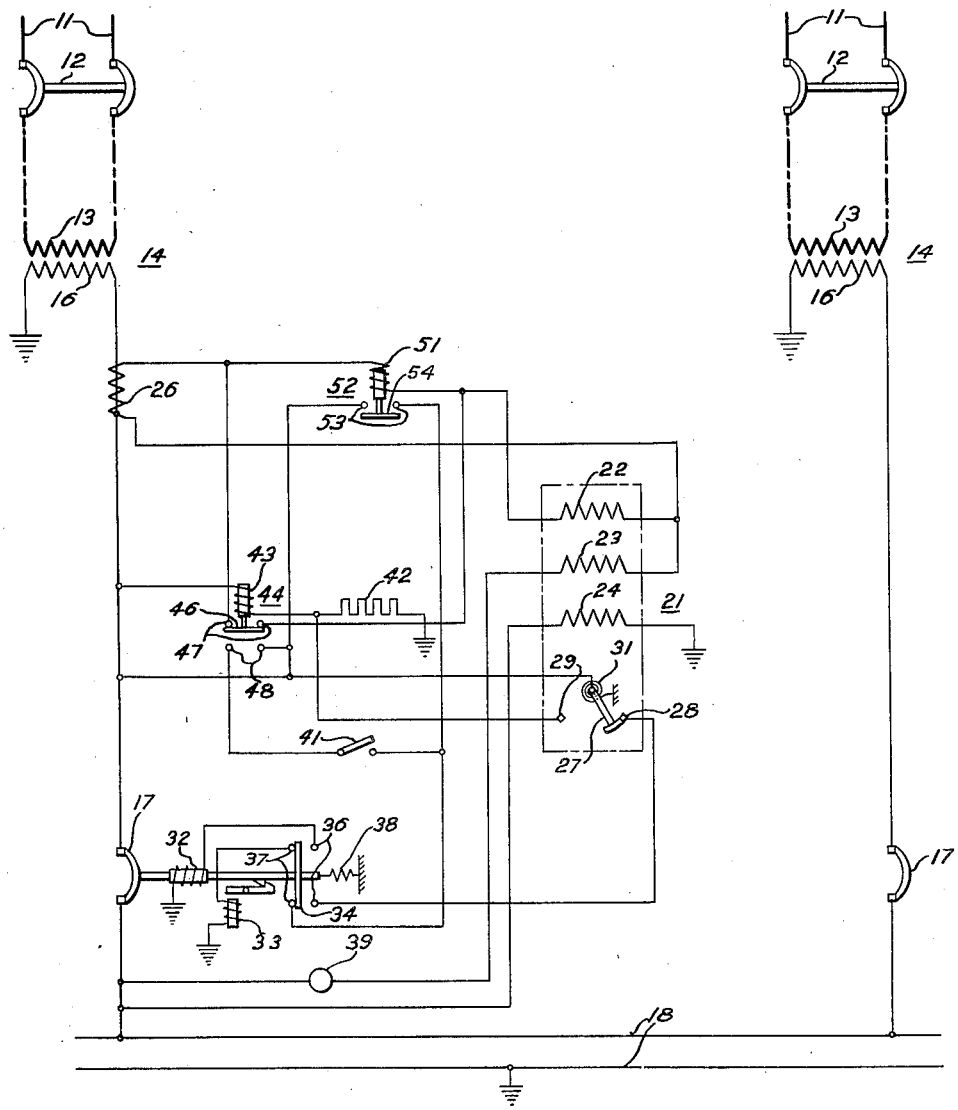
INVENTOR
John S. Parsons
BY
ATTORNEY Patented May 9, 1933

1,907,565

UNITED STATES PATENT OFFICE

JOHN S. PARSONS, OF SWISSVALE, PENNSYLVANIA, ASSIGNOR TO WESTINGHOUSE ELECTRIC & MANUFACTURING COMPANY, A CORPORATION OF PENNSYLVANIA

NETWORK DISTRIBUTION SYSTEM

Application filed October 20, 1930. Serial No. 489,875.

This invention relates to alternating-current systems of distribution and, more particularly, to a means of protection for network systems of the low-voltage alternating-current type.

In a typical network system of distribution, a network load is supplied with energy from a plurality of feeders which may be energized from the same or from different sources of power. The usual means of protection for such network systems is to provide a directional relay associated with each feeder circuit, and a network switch or circuit breaker in the feeder circuit, intermediate the network load and the usual distribution transformer, which is adapted to be opened upon the occurrence of a power reversal or a flow of energy from the network load to the transformer. This type of directional relay is adapted to be effectively energized upon the occurrence of energy flow from the network load to the power source; the magnitude of such power flow usually being of the order of the magnetizing current for the distribution transformer.

Because of the varied loads which may be supplied by the network, frequent reversals of energy flow may be of common occurrence on some systems, and any feeder, therefore, may be alternately connected and disconnected with respect to the network. Elevator motors, for example, constitute a fluctuating load-demand upon the network system, and cause frequent operation of sensitive directional relays of the usual type. This frequent actuation of the directional relay results in unnecessary operations of the network switch and, therefore, increases maintenance expense.

In order to provide a continuous supply of energy to a particular network load, a scheme of synchronizing different sources through the same load was evolved, and a better continuity of service has resulted from this scheme of connections. Obviously, with this scheme of system connections, the cutting of one supply source out of service because of fault conditions at the generating station, or during periods of light load, permits the network load to be supplied with sufficient energy from the remaining supply sources. As a result of synchronizing a plurality of different supply sources through the same network load, the voltages of the various feeder circuits tend to balance, and a circulating current between these circuits occurs.

The value of such circulating currents is often sufficient to effectively energize the sensitive directional relays and cause the actuation of the associated network switches. In this type of system, the circulating-current conditions are aggravated by the possibility of fluctuating loads, and a too frequent operation of the network switch results.

To overcome the difficulties experienced with fluctuating-load and circulating-current conditions, the use of a less sensitive directional relay has been suggested, and also a means for providing a sensitive directional relay which is rendered insensitive under normal system conditions and substantially instantaneously responsive under transformer or feeder-circuit-fault conditions. The present invention constitutes an improved means for protecting a network-distribution system which will permit predetermined magnitudes of energy to flow from the network load to the feeder transformer or power source.

It is an object of this invention, therefore, to provide a means of protection for an alternating-current-network-distribution system which will permit the flow of predetermined amounts of energy from the network load to the power sources, and provide for substantially instantaneous protection upon the occurrence of feeder-circuit-fault conditions.

Another object of this invention is to provide a sensitive directional relay of the usual type, and a current-responsive means controlled thereby for effecting the disconnection of an associated feeder circuit upon the occurrence of a predetermined magnitude of current flowing in the feeder circuit.

Another object of this invention is to provide a control means, including a sensitive directional relay, and relay means associated therewith for rendering the control means inoperative under normal system conditions and predetermined magnitudes of reverse current flow. Upon the occurrence of primary or feeder-circuit faults, the relay means, associated with the directional relay, responds to effect the disconnection of the faulty circuit substantially without delay.

Further objects and applications of this invention will become apparent from the following description of a preferred embodiment of the present invention, as applied to a typical network-distribution system.

For purposes of clarification, the present invention will be described with reference to a single-line diagram, but it is obvious that an alternating-current system, having any number of phases, may be understood as being within the scope of the present invention.

Referring to the single figure of the drawing, a plurality of power sources 11 are adapted to energize the primary windings 13 of distribution transformers 14, through feeder-circuit interrupters 12. The secondary windings 16 of the respective distribution transformers 14 are connected to a network-load circuit 18, through network switches 17.

Because the network switches 17 and the associated control means are usually placed in manholes and in other positions where they are not easily accessible, it is necessary that these switches be automatically operative at all times, and a proper control means for the respective network switches is, therefore, mandatory.

To understand the operation of the present invention more fully, as applied to a network system of the usual type, the several system-operation conditions will be considered.

Supposing the network load 18 to be deenergized and, consequently, the network switches 17 and the feeder-circuit interrupters 12 to be in their opened positions, it is desired to energize the network load 18 from one of the sources 11. Because the protective means for the several feeders are substantially alike, the application thereof has been shown with respect to only one feeder circuit. To effect the energization of the network load 18, the feeder-circuit interrupter 12 may be either manually or automatically actuated to its closed position, at the will of the operator or controller at the supply source or generating station. Upon the closure of the circuit interrupter 12, the primary winding 13 of the distribution transformer 14 becomes energized.

A directional relay 21, having a current winding 22, a phasing winding 23 and a voltage winding 24, is provided for the purpose of indicating the occurrence of a reversal of power flow or flow of energy from the network 18 to the distribution transformer 14. Current coil 22 of the relay 21 is adapted to be energized in accordance with the current flowing in the feeder circuit associated with the secondary winding 16 of the distribution transformer 14. To effect this energization, a current transformer 26 connected in the feeder circuit between the transformer 14 and the network switch 17 has its secondary winding connected in parallel with the current winding 22. The phasing winding 23 has one of its terminals connected to the distribution-transformer side of the network switch 17 and its other terminal connected to the secondary feeder circuit on the network side of the network switch 17, through a phasing lamp 39 or some suitable resistance or current-limiting means. The voltage winding 24 is connected to the network-load side of the network switch 17 and is adapted to be energized in accordance with the voltage of the network 18. The fluxes of the current winding 22 and the voltage winding 24 combine to effect the rotation of a movable contact 27 into engagement with a stationary contact member 28 under normal system conditions or when the flow of energy is from the distribution transformer 14 to the network load 18.

The movable contact member 27 of the relay 21 is electrically connected to the distribution-transformer side of the network switch 17, and a biasing spring 31 normally effects the engagement of the movable contact member 27 and the stationary contact member 28 so that a circuit is completed through the contacts 36 and a pallet switch 34 of the network switch 17, to effect the energization of closing coil 32 when the network switch 17 is in its open position. The network switch 17 is normally biased toward its opened position by means of the spring 38, and the pallet switch 34 engages the contacts 36.

Upon energization of the distribution transformer 14, and supposing the network switch 17 to be in its opened position, a circuit is completed from the grounded side of the secondary winding 16 of the distribution transformer 14, through the secondary winding 16, the movable contact member 27, stationary contact member 28, contacts 36 and pallet switch 34 and closing coil 32 of the network switch 17, to ground. The closing coil 32 is thereby energized in accordance with the distribution-transformer voltage to effect the closure of the network switch 17 which is then automatically locked in its closed position. A resulting electrical circuit is completed from the supply source 11, through the distribution transformer 14 and the network switch 17, to the network load 18. Since only one supply source 11 is connected to the network load 18, no troubles due to circulating currents or load fluctuations are present to affect the proper flow of energy from the supply source 11 to the network load 18.

Assuming, however, that the network load 18 is energized from one or more supply sources 11, and that it is desired to connect an additional supply source thereto, the sequence of operation is considerably changed.

Supposing both the network switch 17 and the feeder-circuit interrupter 12 of the incoming feeder to be in their open positions, the feeder-circuit interrupter 12 is either manually or automatically closed, at the will of the central station operator or attendant. The distribution transformer 14 becomes energized, as before, and the network switch 17 is closed in the manner above described, provided that the transformer voltage is greater than, and substantially in phase with, the network voltage. To assure the existance of proper conditions between the two voltages before the network switch 17 is permitted to be actuated to its closed position, the fluxes of the phasing winding 23 and the voltage winding 24 of the relay 21 combine to produce a torque which operates to maintain the contacts 27 and 28 in their engaged position or to rotate the contact 27 out of engagement with the contact member 28, depending upon whether the magnitude and phase position of the respective voltages are such as to effect the flow of power from the supply source 11 to the network load 18 or in the reverse direction. The phasing lamp 39 is serially connected to the phasing winding 23 to prevent excessive currents from traversing the phasing winding 23 while the network switch 17 is in its opened position.

As is usual in a directional relay of the type utilized in the present invention, the voltage winding is normally biased to prevent the relay contacts from being closed by the action of the relay contact spring. It is necessary, therefore, for a closing torque to be exerted by the voltage and phasing windings before the contacts are actuated to their closed position.

Assuming the magnitude and phase positions of the feeder and network load voltages to be in a proper phase relation, the torque produced by the combined fluxes of the phasing winding 23 and voltage winding 24 of the relay 21 will act to maintain the movable contact 27 in engagement with the contact member 28, and an electrical circuit is thereby completed through the closing coil 32 of the network switch 17 to effect the closure thereof. Under these conditions, the closing of the network switch 17 results in a flow of energy from the distribution transformer 14 to the network load 18 and the consequent energization of the current transformer 26. The current winding 22 of the relay 21 is, therefore, energized in accordance with the current flowing in the secondary feeder circuit of the distribution transformer 14, and the resultant flux produced by this winding is combined with the flux produced by the voltage winding 24, to produce a rotating torque which tends to maintain the movable contact 27 in engagement with the contact member 28 only when the direction of the flow of current through the current transformer 26 is from the distribution transformer 14 to the network 18. A rotating torque in the opposite direction, or one tending to rotate the movable contact 27 into engagement with the contact member 29, results whenever the flow of current in the current transformer 26 is in a direction from the network 18 to the distribution transformer 14.

Assuming the manually operable switch 41 to be in its closed position and the condition of a small amount of power flow from the network 18 to the distribution transformer 14, such reversal of power flow resulting from circulating current or a fluctuating load condition on the network load 18, the network relay 21 will be actuated to effect the opening of the network switch 17. Under such conditions, the directional relay 21 is energized to effect the actuation of its associated network switch 17, in a manner well known to those versed in the prior art. Briefly, the current coil 22 is energized in accordance with the magnitude and phase position of current in the secondary circuit of the distribution transformer 14, by means of the current transformer 26, and the flux produced by this current coil 22 combines with the flux produced by the voltage coil 24 to produce a torque acting to rotate the movable contact 27 into engagement with the contact member 29.

A normally energized relay 44 has one terminal of its energizing winding 43 connected to the transformer side of the network switch 17, and the other terminal of the energizing winding 43 is serially connected to a current-limiting resistor 42 and thence to ground. The closing of the contacts 27 and 29 shunts the normally energized winding 43 of the voltage relay 44 and contacts 48 are electrically connected by means of the bridging contact 46. A resulting tripping circuit is completed from the transformer side of the network switch 17 through the contacts 48 bridging contact 46, switch 41, contacts 37, pallet switch 34 and tripping coil 33 of the network switch 17. The energization of the tripping coil 33 effects the actuation of the network switch 17 to its open position and the feeder or source of supply is thereby effectively isolated from the network 18.

In accordance with this invention, the switch 41 is normally in its open position, and the actuation of the directional relay 21, upon the occurrence of small power reversal, does not immediately provide for the energization of the tripping coil 33 of the network switch 17. Instead, the energizing winding 43 of the relay 44 is shunted by the closing of the contacts 27 and 29, and the circuit between the normally closed contacts 47 of the relay 44 is opened. Because the switch 41 is in its open position, the closing of the contacts 48 does not complete an electrical circuit, and the opening coil 33 of the network switch 17 is not energized. However, the opening of the contacts 47 permits the energization of the normally deenergized winding 51 of overcurrent relay 52, the winding 51 thereof being serially connected with the energizing circuit for the current winding 22 of the directional relay 21. It may be readily understood that the effective energization of the overcurrent relay 52 may be varied at will to satisfy the circuit conditions of any particular distribution system. Thus, the value of current necessary for the effective energization of the winding 51 may be adjusted for any desired value of reverse-current flow in the secondary circuit of the distribution transformer 14. In practice, this adjustment is usually about 20% of the full-load rating of the network switch.

Under normal conditions, none of the relays 21, 44 and 52 will be energized to complete any electrical circuits, or in any way effect the actuation of the network switch 17. For small reversals of power flow, due to circulating current or fluctuating load conditions, it is undesirable that the network switch 17 should be actuated to its open position, since such circulating currents or fluctuating loads may be merely transient system conditions, and the magnitude and phase conditions of the transformer and network load voltages may be such as to result in the completion of the closing circuit of the network switch 17 through the contacts 27 and 28 of the directional relay 21, contacts 36, pallet switch 34 and the closing coil 32 of the network switch 17. Immediately, however, the former conditions of circulating current, or the occurrence of any particular fluctuating load, may cause the actuation of the directional relay 21 to effect the opening of the network switch 17, and the resulting operation of the network switch 17 becomes highly objectionable, both from the standpoint of the central station operator and that of the consumer deriving energy from the network load.

Because of the frequent operation of the network switch 17, when only sensitive directional relays, such as the directional relay 21 are utilized, and because the flow of small amounts of energy from the network 18 to the distribution transformers 14 is not objectionable, the present invention solves the problem in a simple and positive manner and further permits the flow of reverse energy of any desired magnitude depending upon the particular type or the operating conditions of the system to be protected.

Assuming a fault condition, such as a short circuit, to occur upon the feeder or supply source 11, or that the distribution transformer 14 becomes faulty, a large short-circuit current will flow from the network 18 to the distribution transformer 14, and the directional relay 21 will be actuated to close its contacts 27, 29 and the normally energized relay 44 will be deenergized, thereby open-circuiting the contacts 47 and permitting the full energization of the energizing winding 51 of the overcurrent relay 52. Because of the high value of current flowing through the current transformer 26, and also the energizing winding 51 of the overcurrent relay 52, the contacts 53 will be closed by the actuation of the bridging contact 54, and a tripping circuit for the network switch 17 will be completed from the transformer side of the network switch 17 through the contacts 53 and bridging contact 54 of the overcurrent relay 52 and the contacts 37, pallet switch 34 and the tripping coil 33 of the network switch 17. The network switch 17 will, therefore, be actuated to its open position substantially without delay upon the occurrence of a fault upon the primary or feeder side of the distribution transformer 14, or a fault in the distribution transformer 14.

As has been mentioned hereinbefore, the opening of the network switch 17, does not depend merely upon the occurrence of a short circuit or fault on the feeder circuit 11 or in the distribution transformer 14, since the opening of the network switch 17 may be effected upon the occurrence of any predetermined flow of current from the network 18 to the distribution transformer 14.

Since this opening of the network switch 17 may be substantially instantaneous, as a result of feeder or primary fault conditions, and varied at will, depending upon the operating conditions of the particular system to be protected and the setting of the overcurrent relay 52, it is obvious that the control means for the network switch 17 may be made as sensitive as may be desired by either closing the switch 41, to thereby permit the network switch 17 to be controlled by the actuation of only the sensitive directional relay 21, or by opening the switch 41 and permitting the sensitive directional relay 21 to be actuated upon the occurrence of any small value of reverse-energy flow, thereby resulting in the deenergization of the relay 44 and the consequent energization of the overcurrent relay 52, which energization may be varied at will to effect the degree of effective energization desired.

The purpose of relay 44 is to prevent the continuous energization of the current-responsive relay 52 by a current of the order of four or five times its usual setting when full load current is flowing through the network switch 17 to the network 18. The relay 44 may be omitted from the control circuit, thereby permitting the winding 51 of the current-responsive relay 52 to be energized at all times, provided however, that the contacts 53 are connected in series with the directional relay contacts 27, 29, and the relay 52 is so designed as to carry several times its operating current continuously. If the relay is not designed to carry several times its operating current, it is necessary to set it to operate at approximately full-load current, or above. If the relay 52 is designed and set to operate substantially below full-load current, it is necessary under some conditions, that its contacts 53 be permitted to open before the directional relay contacts 27, 29 close. Otherwise, assuming a current in a feeder circuit to be above the actuating value of the relay 52 while energy is being delivered to the network 18, a small reversal of energy flow would cause the directional relay 21 to close its contacts 27, 29 and effect the opening of the network switch 17. The use of relay 44 prevents this undesirable opening of the network switch 17.

The present invention has been described with reference to a single-line diagram but should not be construed as being limited to any particular alternating-current network system of distribution since it may be applied to any single-phase or polyphase system. It is apparent that the present invention, while permitting predetermined values of energy flow from a network load to an associated feeder, still provides for the substantially instantaneous isolation of a feeder upon the occurrence of fault conditions on such feeder.

Because of the novelty and utility of the present invention, as applied to protective means for existing and future alternating-current network systems of distribution, no limitations other than those required by the prior art and indicated in the appended claims should restrict the spirit and scope thereof.

I claim as my invention:

1. In an alternating-current system of distribution, a plurality of feeder circuits, a load circuit energized thereby, circuit-interrupting means for effecting the connection of each feeder circuit to said load circuit, control means for said circuit-interrupting means including a directional relay associated with said feeder circuit, and relay means responsive to the magnitude of current flow in said circuit and controlled by the actuation of said directional relay for effecting the opening of said circuit-interrupting means only upon the occurrence of a current flow of predetermined magnitude and phase position.

2. In an alternating-current system of distribution, a network load, a plurality of feeders connected thereto, a circuit interrupter for each of said feeders, control means for said circuit interrupter including a directional relay associated with said feeder and means including an over-current responsive device responsive to the magnitude of current flow in said system and controlled by said relay for effecting the actuation of said circuit interrupter.

3. Protective means for an alternating-current system including a feeder circuit, a circuit interrupter therefor, and control means for said interrupter including current-responsive means responsive to the magnitude of current flow in said circuit and effectively energized in accordance with a predetermined magnitude of current flow in said circuit only when the energy flow in said feeder is in a predetermined direction.

4. In an alternating-current system including a circuit interrupter, control means therefor including a directional relay energized from said system, and means including current-responsive means effectively energized in accordance with the current flowing in said system upon the actuation of said relay means only when the system current is of a predetermined magnitude.

5. In an alternating-current system including a circuit interrupter therein, control means therefor including a directional relay electrically associated with said system, means responsive to the magnitude of current flowing in said system, and means controlled by said relay for normally effecting the deenergization of said first means.

6. In an alternating-current network system of distribution, a circuit interrupter control means therefor including a directional relay electrically associated with said system, means effectively energized in accordance with a predetermined magnitude of current flowing in said system, and means responsive to the actuation of said relay for effecting the energization of said first means.

7. In an alternating-current system of distribution, a working circuit, a plurality of feeder circuits for supplying energy to said working circuit, a transformer in each feeder circuit, a circuit-interrupter between each transformer and said working circuit, and control means for said circuit interrupter including a directional relay electrically associated with said feeder, and means including relay means effectively energized only upon the actuation of said relay and for a predetermined magnitude of current flow in said feeder to cause the opening of said circuit interrupter.

8. In an alternating-current system of distribution, a working circuit, a plurality of feeder circuits for supplying energy to said working circuit, a transformer in each feeder circuit, a circuit interrupter between each transformer and said working circuit, control means for said circuit interrupter including a directional relay associated with said feeder, and relay means effectively responsive only upon the actuation of said directional relay to cause the opening of said circuit interrupter substantially instantaneously in the event of feeder fault conditions and when the current flowing in said feeder is of a predetermined magnitude.

9. In an alternating-current system of distribution, a working circuit, a plurality of feeder circuits for supplying energy to said working circuit, a transformer in each feeder, a circuit interrupter between each transformer and said working circuit, control means for said circuit interrupter comprising a directional relay electrically associated with said feeder, and relay means responsible to the actuatiton of said relay for opening said circuit interrupted substantially instantaneously in the vent of a feeder or transformer fault and for allowing the flow of a predetermined magnitude of reverse current.

10. In an alternating-current system, a circuit interrupter, a directional relay electrically associated with said system, current-responsive means electrically associated with said system and said directional relay and arranged to be energized in accordance with the magnitude of current flow in said system, and means for effectively energizing said current-responsive means only upon the actuation of said directional relay and the flow of a predetermined magnitude of current in said system for controlling the operation of said interrupter.

11. In a system of electric distribution, two alternating current circuits, switching means for interconnecting said circuits, and means for effecting the opening of said switching means including a power directional relay responsive to the direction of power flow through said switching means, and overload responsive means controlled by said power directional relay for effecting the opening of said switching means when power flows through said switching means in a predetermined direction.

12. In a system of electric distribution, two alternating current circuits, switching means for interconnecting said circuits, and means for effecting the opening of said switching means including a power directional relay responsive to the direction of power flow through said switching means, and relay means responsive to the current through said switching means and cooperating with said power directional means to effect the opening of said switching means only when the power flow is in a predetermined direction and exceeds a predetermined value.

13. In a system of electric distribution, two alternating current circuits, a switch for connecting said circuits, and means for controlling the opening and closing of said switch including a power directional relay responsive to the direction of power flow through said switch when closed; means controlled by said power directional relay when said switch is open for effecting the closing of said switch in response to the voltages of said circuits, and overload means controlled by said power directional relay for effecting the opening of said switch when a predetermined power flows to said one of said circuits from the other circuit.

14. In a system of electric distribution, two alternating current circuits, a switch for connecting said circuits, and means for controlling the opening and closing of said switch including a power directional relay responsive to the direction of power flow through said switch when closed, means controlled by said power directional relay when said switch is open for effecting the closing of said switch in response to the voltage of one of said circuits, a relay arranged when energized to effect the opening of said switch, and means controlled by said power directional relay for completing an energizing circuit for said relay when current flows to said one of said circuits from the other of said circuits; said relay responsive to a predetermined amount of power flow from said other circuit to said one of said circuits for effecting the opening of said switch.

15. In a system of electric distribution, an alternating current feeder circuit, a load circuit, a transformer connected between said feeder and load circuits, a switch in the secondary circuit of said transformer, and means for controlling the opening and closing of said switch including a power directional relay responsive to the direction of power flow through said switch, means controlled by said power directional relay for effecting the closing of said switch when said transformer secondary is energized and said switch is open, and relay means controlled by said power directional relay for effecting the opening of said switch when a predetermined current flows from said load circuit to said transformer.

16. In a system of electric distribution, an alternating current feeder circuit, a load circuit, a transformer connected between said feeder and load circuits, a switch in the secondary circuit of said transformer, and means for controlling the opening and closing of said switch including a power directional relay responsive to the direction of power flow through said switch, means controlled by said power directional relay for effecting the closing of said switch when said transformer secondary is energized and said switch is open, and means controlled by said power directional relay for effecting the opening of said switch when power flows from said load circuit to said transformer, said means including an overload responsive means cooperating with said power directional relay for effecting the opening of said switch when the amount of power flowing from said load circuit to said transformer exceeds a predetermined amount.

17. In a system of electric distribution, an alternating current feeder circuit, a load circuit, a transformer connected between said feeder and load circuits, a switch in the secondary circuit of said transformer, having a closing coil and a trip coil, an energizing circuit for said coils connected to the secondary of said transformer, a power directional relay responsive to the direction of power flow through said switch when closed, a relay controlled by said power directional relay so that said relay is energized when power flows from said load circuit to said transformer, contacts in the energizing circuit of said closing coil controlled by said power directional relay and contacts in the energizing circuit of said trip coil controlled by said relay so that they are closed after a predetermined magnitude of power has flowed from said load circuit to said transformer.

18. In a system of electric distribution, an alternating current feeder circuit, a load circuit, a transformer connected between said feeder and load circuits, a switch in the secondary circuit of said transformer having a closing coil and a trip coil, an energizing circuit for said coils connected to the secondary of said transformer, a power directional relay responsive to the direction of power flow through said switch when closed, overload responsive means connected in said transformer secondary circuit, contacts in the energizing circuit of said closing coil controlled by said power directional relay, and contacts controlled by said overload responsive means so that they are closed when the power flowing through said switch exceeds a predetermined value.

In testimony whereof, I have hereunto subscribed my name this 15th day of October 1930.

JOHN S. PARSONS.